US008063877B2

(12) United States Patent
Shih et al.

(10) Patent No.: US 8,063,877 B2
(45) Date of Patent: Nov. 22, 2011

(54) DRIVING CIRCUIT AND DRIVING METHOD FOR INPUT DISPLAY

(75) Inventors: Po-Sheng Shih, Tao-Yuan Hsien (TW); Po-Yeng Chen, Tao-Yuan Hsien (TW)

(73) Assignee: HannStar Display Corporation, Tao-Yuan Hsien (TW)

( * ) Notice: Subject to any disclaimer, the term of this patent is extended or adjusted under 35 U.S.C. 154(b) by 0 days.

(21) Appl. No.: 12/826,948

(22) Filed: Jun. 30, 2010

(65) Prior Publication Data

US 2010/0265220 A1 Oct. 21, 2010

Related U.S. Application Data

(60) Division of application No. 11/428,997, filed on Jul. 6, 2006, now Pat. No. 7,812,811, which is a continuation-in-part of application No. 11/424,025, filed on Jun. 14, 2006, now Pat. No. 7,623,112.

(51) Int. Cl.
*G09G 3/38* (2006.01)
*G02F 1/133* (2006.01)

(52) U.S. Cl. ...................... 345/104; 345/173; 178/18.01

(58) Field of Classification Search .................. 345/104, 345/173–178; 348/294; 178/18.01, 18.11; 257/59, 72

See application file for complete search history.

(56) References Cited

U.S. PATENT DOCUMENTS

| | | | |
|---|---|---|---|
| 5,638,121 | A | 6/1997 | Hosier et al. |
| 6,947,102 | B2 | 9/2005 | den Boer et al. |
| 7,522,133 | B2 | 4/2009 | Kwak |
| 2002/0030768 | A1 | 3/2002 | Wu |
| 2002/0070905 | A1 | 6/2002 | Kodate et al. |
| 2002/0084960 | A1 | 7/2002 | Song et al. |
| 2003/0063706 | A1 | 4/2003 | Ikeda et al. |
| 2004/0008172 | A1 | 1/2004 | Nakamura et al. |
| 2004/0046900 | A1 | 3/2004 | Boer et al. |
| 2004/0201786 | A1 | 10/2004 | Park et al. |
| 2005/0231656 | A1 | 10/2005 | den Boer et al. |
| 2007/0109239 | A1 | 5/2007 | den Boer et al. |

FOREIGN PATENT DOCUMENTS

WO 03071345 A1 8/2003

*Primary Examiner* — Srilakshmi K Kumar

(74) *Attorney, Agent, or Firm* — Volpe and Koenig, P.C.

(57) ABSTRACT

A driving circuit for an input display is provided. The driving circuit includes first and second data lines disposed in parallel with each other, first and second gate lines disposed in parallel with each other and intersected with the first and the second data lines, so as to form a pixel of the input display thereby, a common line disposed between the first and the second gate lines, a first switching element having a first gate electrode connected to the first gate line, a second switching element having a second gate electrode connected to the second gate line, and a third switching element connected between the common line and the second switching element and operating in a forward-bias state. The first and second gate lines operate in sequence and the first and second switching elements are respectively activated by the first and second gate lines in sequence.

20 Claims, 10 Drawing Sheets

20

DRIVING CIRCUIT AND DRIVING METHOD FOR INPUT DISPLAY

CROSS REFERENCE TO RELATED APPLICATIONS

This application is a division of U.S. patent application Ser. No. 11/428,997, filed Jul. 6, 2006, which application is a continuation-in-part of U.S. patent application Ser. No. 11/424,025, filed Jun. 14, 2006, which issued on Nov. 24, 2009 as U.S. Pat. No. 7,623,112, which are incorporated by reference as if fully set forth.

FIELD OF INVENTION

The present invention relates to a driving circuit for an input display, and more particular to a driving circuit with shared common voltage for the pixel element and the photo element of a readout pixel of an input display.

BACKGROUND

With the photosensitivity of the amorphous silicon, the input displays are provided with the embedded photo elements. Since the process of the amorphous silicon photo elements and the readout circuit layout of an input display are compatible with the known process of the thin film transistor array of the active matrix liquid crystal display, the manufacturing cost of the input display with embedded amorphous silicon as the photo element is more competitive than the known input display with a touch panel attached thereon.

Furthermore, the optical transmittance of the input display with the touch panel would be degraded by 20%; while the optical transmittance of the input display with amorphous silicon as the sensing devices is only dependent on the layouts of the photo sensing devices and the readout line in each pixel. Therefore, it is apparent that the input display with an amorphous silicon photo element embedded thereon is a more promising way to construct the readout pixel of the input display.

Generally, there are two typical designs of the amorphous silicon photo elements used in the input display. Please refer to FIG. 1(A) and FIG. 1(B), which respectively shows the schematic diagram of a charge-based photo element and a current-based photo element in a readout pixel of the input display. As shown in FIG. 1(A), the charge-based photo element 10 comprises a photo thin film transistor (TFT) 11, a switch TFT 12 and a capacitor C. As shown in FIG. 1(A), the activation of the switch TFT 12 is controlled by an input SW. When the switch TFT 12 is switched to on state, a current from the readout line will charge the capacitor C which is connected to the photo TFT 11 in parallel. Then, when the switch TFT 12 is switched to off state, the charge stored in the capacitor C will be discharged through the photo TFT 11. When the switch TFT 12 is switched to on state again, a current from the readout line will recharge the capacitor C back to the original charge again. Accordingly, the charge refilled to the capacitor C can be used for estimating the photo current generated by the photo TFT 11. As to the current-based photo element 20 shown in FIG. 1(B), it includes a photo TFT 21 which receives a bias voltage $V_{Bias}$ to generate a photo current, a switch TFT 22 activated by an input SW for controlling the current to be transferred to the readout line. In such a current-based photo element, the photo current value is directly read out from the readout line.

It should be noted that both the charge-based and the current-based photo element use the photo TFT 11, 21 to generate the photo current and use the switch TFT to control the readout of the photo current. However, the current characteristics of the photo TFT between a forward-bias operation and a reverse-bias operation are asymmetric. Please refer to FIG. 2, which shows the respective characteristic curves of photo currents of a photo TFT in an illuminated state and in a non-illuminated state. As shown in FIG. 2, when the photo TFT is illuminated, the generated photo current will behave as the characteristic curve $\mathbf{1_2}$, which includes a forward-bias operation in a condition of the Vgs>0, which is also called on current state, and a reverse-bias operation in a condition of the Vgs<0, which is also called off current state. When the photo TFT is not illuminated, the generated photo current will behave as the characteristic curve $I_1$, which also includes a forward-bias operation in a condition of the Vgs>0, which is also called on current state and a reverse-bias operation in a condition of the Vgs<0, which is also called off current state. Typically, the photo TFT should operates in the forward-bias state, in order to abate the signal delay resulting from the parasitic resistance and capacitance of the readout line.

Although the parasitic resistance and capacitance issue can be overcome by the forward-bias operation of the photo TFT, the readout pixel of the input display still exists a problem relating to the pixel voltage control of the readout pixel. Please refer to FIG. 3(A), which schematically shows an equivalent driving circuit in an input display according to the prior art. As can be seen from FIG. 3(A), the driving circuit 100 in each readout pixel includes a first and a second gate lines $G_{n-1}$, $G_n$, and a first and a second data lines $D_{m-1}$, $D_m$ intersecting to each other, so as to form the readout pixel of the input display. Furthermore, in each readout pixel, a readout line 103 is disposed between the first and the second data lines $D_{m-1}$, $D_m$ and passing through the readout pixel, while a common line $C_{p-1}$, is disposed between the first and the second gate lines $G_{n-1}$, $G_n$. Moreover, in each readout pixel, there are still two main parts, i.e. a pixel element 101 and a photo element 102 formed therein. As shown in FIG. 3(A), both the pixel element 101 and the photo element 102 are electrically connected to the common line $C_{p-1}$, through which a reference voltage is provided to a storage capacitor $C_{st}$ of the pixel element 101 and through which a bias voltage is provided for driving a photo current generated by the photo element 102. Furthermore, it also can be known from the FIG. 3(A) that the pixel element 101 has a pixel TFT 1011 connected to a pixel electrode (not shown) of the input display, and the pixel electrode and a common electrode (not shown) of the input display form a liquid crystal capacitor $C_{lc}$. Moreover, a further storage capacitor $C_{st}$ in FIG. 3(A) is formed by the pixel electrode and the common line $C_{p-1}$.

Please further refer to FIG. 3(B), which schematically shows the operation of the driving signals according to the driving circuit of FIG. 3(A). When the first gate line $G_{n-1}$ is provided with a signal with a relatively high state, the pixel TFT 1011 of the pixel element 101 is switched on, and a signal from the first data line $D_{m-1}$ is input to the pixel element 101 and a pixel voltage $V_{pixel}$ is generated thereby for providing a gray value for pixel element 101. At the same time, a switch TFT 1021 of the photo element 102 is switched on and a photo current generated by a photo TFT 1022 is output through the switch TFT 1021 to the readout line 103. Since the common voltage provided by the common line will be affected by the parasitic resistance, the voltage difference between the pixel voltage and the common voltage would be fluctuant. When the first gate line $G_{n-1}$ is provided with a signal with a relatively low state, the pixel TFT 1011 and the switch TFT 1021 are closed, and the photo current is vanished. Since the photo current is vanished, the common voltage provided by the common line will resume to a steady voltage. However, when the common voltage of the common line fluctuates again, the pixel voltage would be affected by the coupling effect. Therefore, the gray value for pixel element 101 will be affected.

Based on the above, it is the main aspect of the present invention to provide an improved driving circuit of an input display and an improved method for driving an input display, so that the voltage fluctuation issues resulting from the shared common line could be overcome.

SUMMARY

It is a first aspect of the present invention to provide a novel driving circuit for an input display. The driving circuit includes a first and a second data lines disposed in parallel with each other, a first and a second gate lines disposed in parallel with each other and intersected with the first and the second data lines, so as to form a pixel of the input display thereby, a common line disposed between the first and the second gate lines, a first switching element having a first gate electrode connected to the first gate line, a second switching element having a second gate electrode connected to the second gate line, and a third switching element connected between the common line and the second switching element and operating in a forward-bias state.

Preferably, the first and the second gate lines operate in sequence and the first and the second switching elements are respectively activated by the first and the second gate lines in sequence.

Preferably, the first switching element further includes a first drain electrode connected to the first data line, and a first source electrode connected to the common line.

Preferably, the driving circuit further includes a storage capacitor, through which the first source electrode is connected to the common line.

Preferably, the driving circuit further includes a readout line disposed adjacent to the second data line and passing through the pixel of the input display.

Preferably, the second switching element further includes a second drain electrode, and a second source electrode connected to the readout line.

Preferably, the third switching element further includes a third gate electrode and a third drain electrode, both of which are connected to the common line, and a third source electrode connected to the second drain electrode.

Preferably, the third switching element further includes a third gate electrode and a third source electrode, both of which are connected to the second drain electrode, and a third drain electrode connecting to the common line.

It is a second aspect of the present invention to provide a further driving circuit for an input display. The driving circuit includes a first and a second data lines disposed in parallel with each other, a first and a second gate lines disposed in parallel with each other and intersected with the first and the second data lines, a pixel circuit including a pixel transistor having a first gate electrode connected to the first gate line and a photo circuit having a switching transistor having a second gate electrode connected to the second gate line and a photo transistor connected to the switching transistor.

Preferably, the first and the second gate lines operate in sequence and the pixel transistor and the switching transistor are respectively activated by the first and the second gate lines in sequence.

Preferably, the driving circuit further includes a common line disposed between the first and the second gate lines, wherein both the pixel circuit and the photo circuit are connected to the common line.

Preferably, the pixel transistor further includes a first drain electrode connected to the first data line, and a first source electrode connected to the common line.

Preferably, the driving circuit further includes a storage capacitor, through which the first source electrode is connected to the common line.

Preferably, the driving circuit further includes a readout line disposed adjacent to the second data line and passing through the pixel of the input display.

Preferably, the switching transistor further comprises a second drain electrode, and a second source electrode connected to the readout line.

Preferably, the photo transistor further has a third gate electrode and a third drain electrode, both of which are connected to the common line, and a third source electrode connected to the second drain electrode.

Preferably, the photo transistor further has a third gate electrode and a third source electrode, both of which are connected to the second drain electrode, and a third drain electrode connecting to the common line.

It is a third aspect of the present invention to provide a method for driving an input display having a pixel array, where each pixel of the pixel array comprises a first and a second gate lines, a data line, a readout line, a common line, a pixel element and a photo element. The method includes the steps of providing a common voltage through the common line, providing a control data signal through the data line for the pixel element, and sequentially providing a first and a second relatively high signals through the first and the second gate lines to sequentially activate the pixel element and the photo element, wherein when the pixel element is activated through the first relatively high signal through the first gate line, a pixel voltage as a function of the control data signal and the common voltage is generated for providing a gray value to the pixel, and when the pixel element is deactivated and the photo element is activated by the second relatively high signal, a photo current is generated and read out through the readout line.

Preferably, the photo current is driven by a voltage drop between the common line and the readout line.

Preferably, the readout line has a voltage higher than the common voltage.

Preferably, the readout line has a voltage lower than the common voltage.

Preferably, the common voltage is irrelevant to an activation of the photo element when the pixel element is activated.

Preferably, the common voltage is irrelevant to an activation of the pixel element when the photo element is activated.

BRIEF DESCRIPTION OF THE DRAWINGS

The above objects and advantages of the present invention will become more readily apparent to those ordinarily skilled in the art after reviewing the following detailed descriptions and accompanying drawings, in which.

DETAILED DESCRIPTION OF THE PREFERRED EMBODIMENTS

The present invention will now be described more specifically with reference to the following embodiments. It should be noted that the following descriptions of preferred embodiments of this invention are presented herein for purposes of illustration and description only; it is not intended to be exhaustive or to be limited to the precise form disclosed.

Figure 1A:
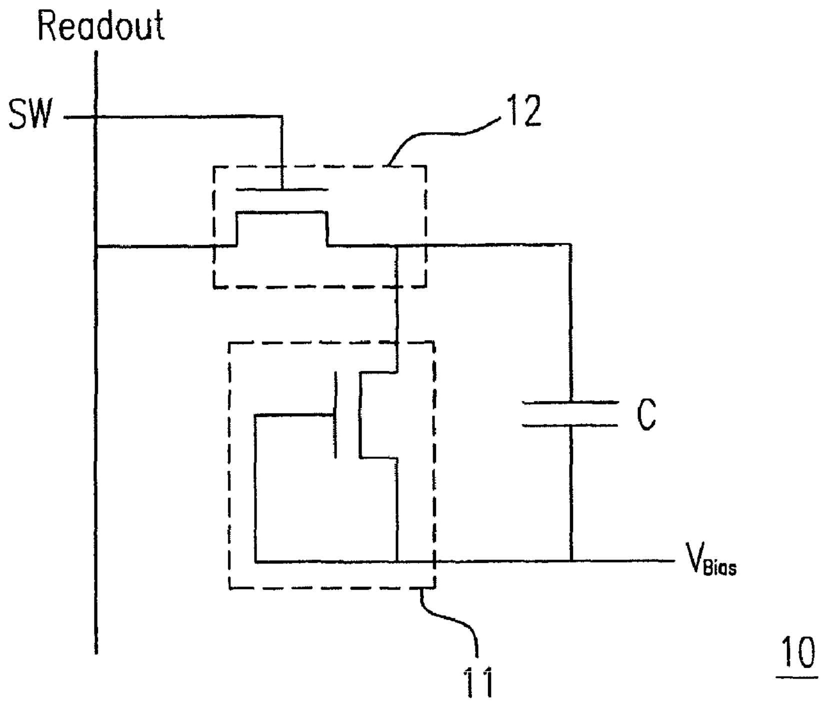
Fig. 1A(PRIOR ART)
FIG. 1(A) and FIG. 1(B) respectively shows the diagram of a charge-based photo element and a current-based photo element in a readout pixel of the input display.
Figure 1B:
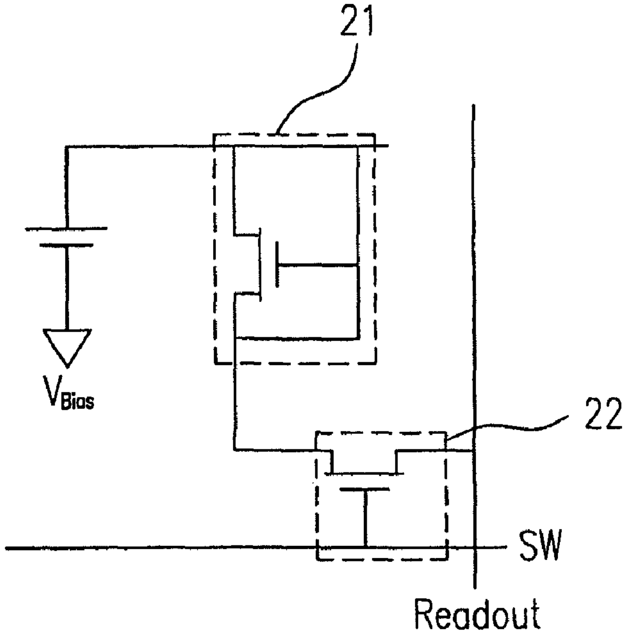
Fig. 1B(PRIOR ART)
Figure 2:
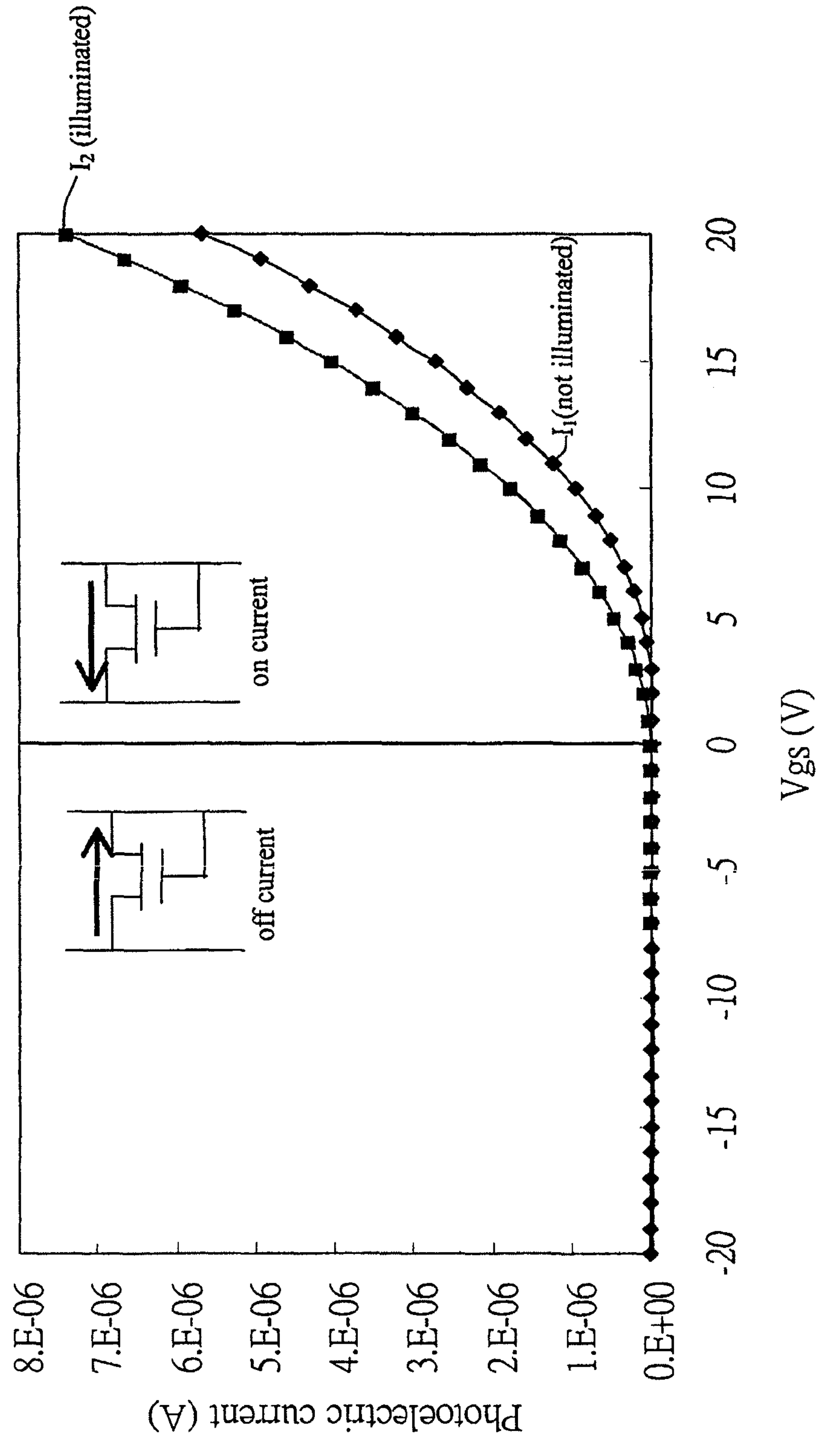
Fig. 2(PRIOR ART)
FIG. 2 shows the characteristic curves of photo currents of a photo TFT in an illuminated state and in a non-illuminated state.
Figure 3A:
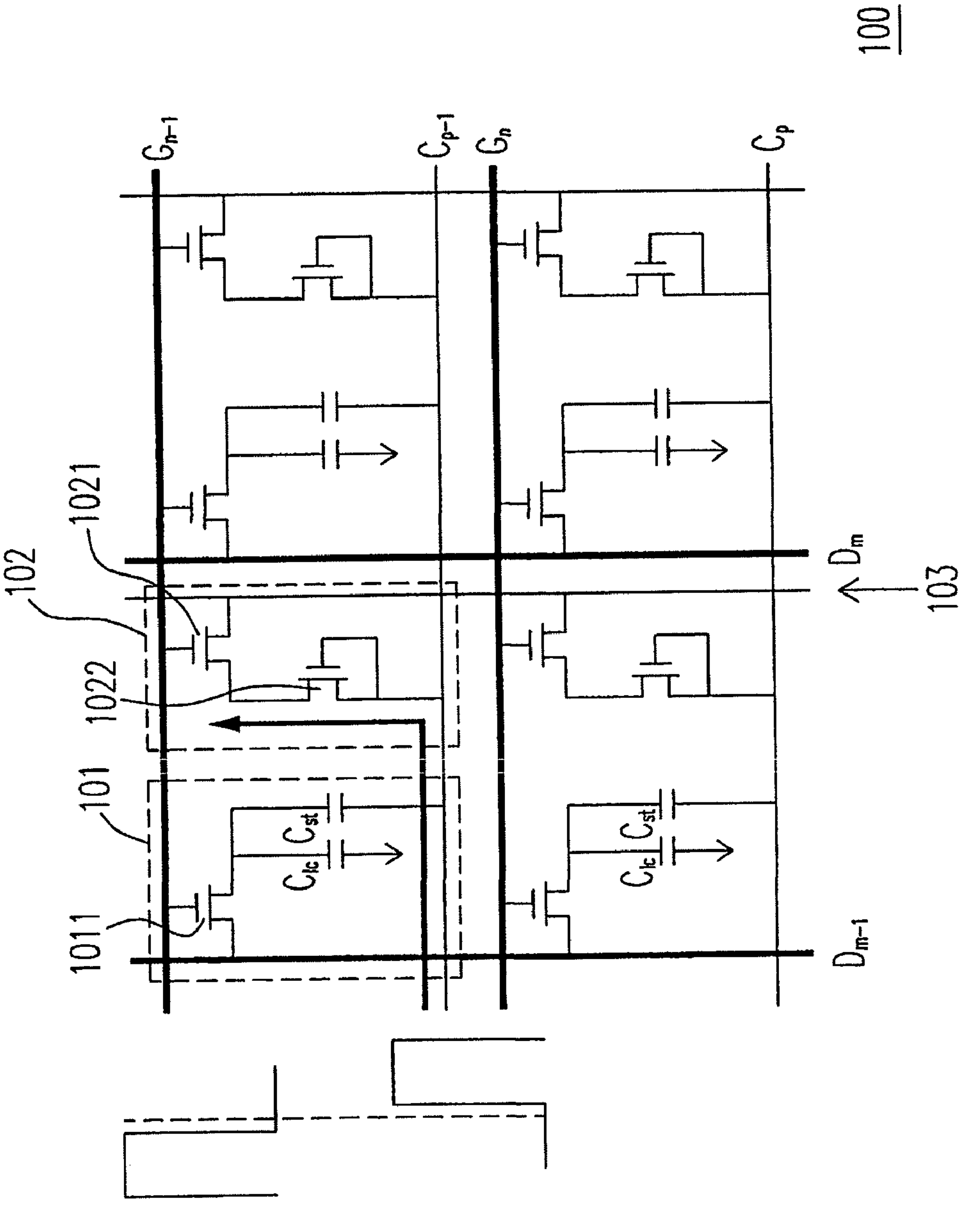
Fig. 3(A)(PRIOR ART)
FIG. 3(A) schematically shows an equivalent driving circuit in an input display according to the prior art.
Figure 3B:
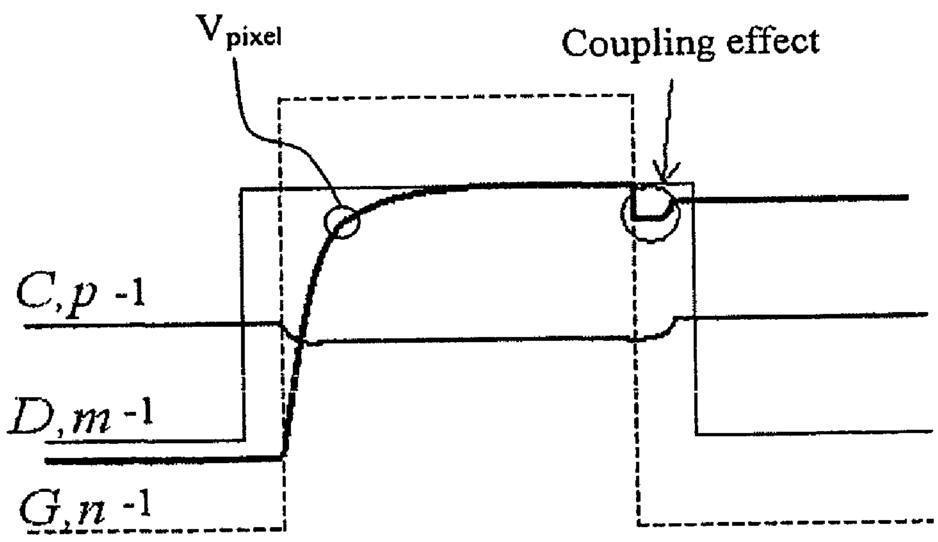
FIG. 3(B) schematically shows the operation of the driving signals according to the driving circuit of FIG. 3(A)
Figure 4A:
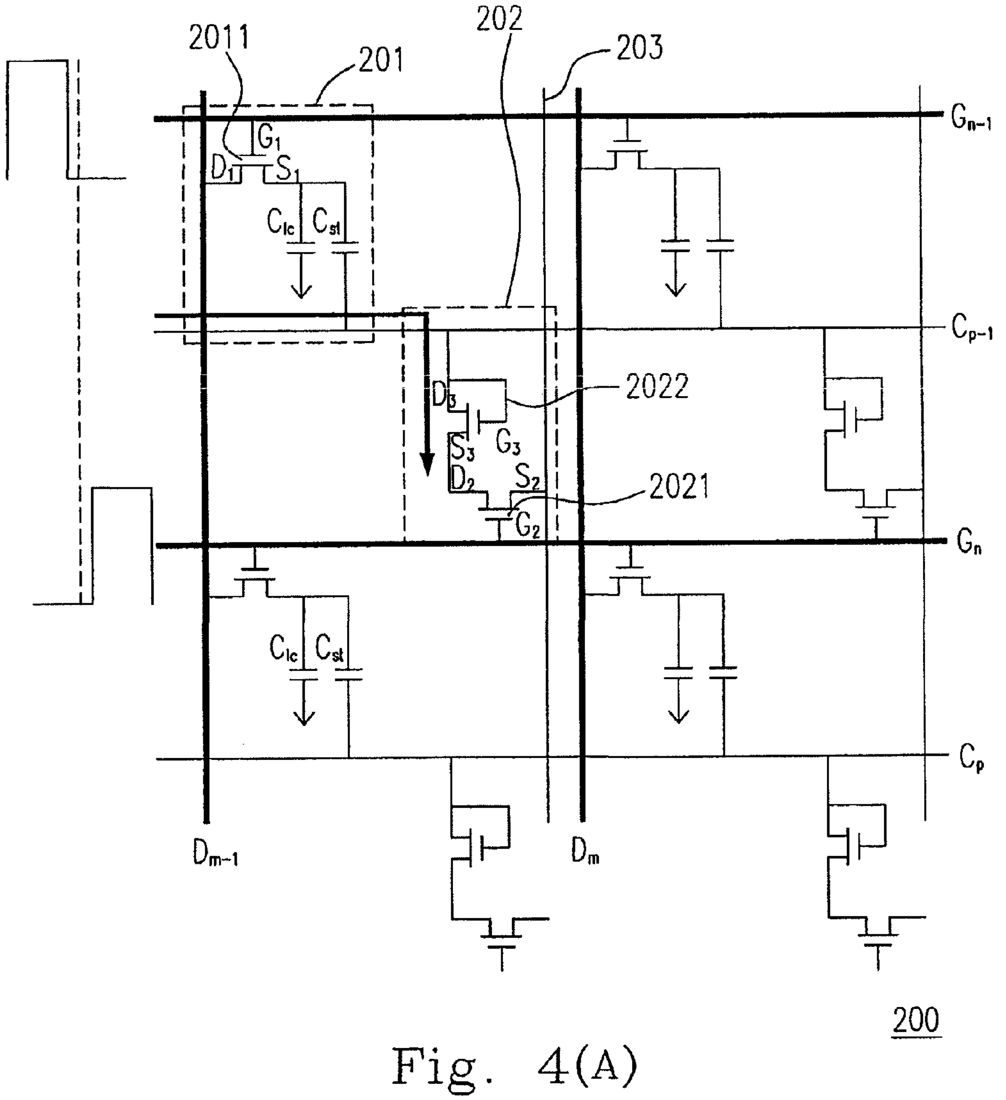
FIG. 4(A) schematically shows an equivalent driving circuit in an input display according to the first embodiment of the present invention.

Please refer to FIG. 4(A), which shows an equivalent driving circuit in an input display according to the first embodiment of the present invention. As can be seen from FIG. 4(A), the driving circuit 200 in each readout pixel includes a first and a second gate lines $G_{n-1}$, $G_n$, and a first and a second data lines $D_{m-1}$, $D_m$ intersecting to each other, so as to form the readout pixel of the input display. Furthermore, in each readout pixel, a readout line 203 is disposed between the first and the second data lines $D_{m-1}$, $D_m$ and passing through the readout pixel, while a common line $C_{p-1}$, is disposed between the first and the second gate lines $G_{n-1}$, $G_n$. Moreover, in each readout pixel, there are still two main parts, i.e. a pixel element 201 and a photo element 202 formed therein. Specifically, the pixel element 201 includes a pixel thin film transistor (TFT) 2011 having a first gate electrode $G_1$ connected to the first gate line $G_{n-1}$, a first drain electrode D, connected to the first data line $D_{m-1}$, and a first source electrode $S_1$ connected to the common line $C_{p-1}$ through a storage capacitor $C_{st}$. As described above, the storage capacitor $C_{st}$ is formed by a pixel electrode connected to the source electrode S, and the common line $C_{p-1}$. Furthermore, the first source electrode S, of the pixel TFT 2011 is also connected to a liquid crystal capacitor $C_{lc}$ which is formed by the pixel electrode and a common electrode (not shown). In a preferred embodiment, the first source electrode $S_1$ of the pixel TFT 2011 is also connected to the common electrode of the input display through the liquid crystal capacitor $C_{lc}$.

On the other hand, the photo element 202 includes a switch TFT 2021 having a second gate electrode $G_2$ connected to the second gate line $G_n$, a second drain electrode $D_2$, and a second source electrode $S_2$ connected to the readout line 203. Furthermore, the photo element 202 further includes a photo TFT 2022 having a third gate electrode $G_3$ and a third drain electrode $D_3$, both of which are connected to the common line $C_{p-1}$, and a third source electrode $S_3$ connected to the second drain electrode $D_2$.

In such driving circuit 200 according to the first embodiment of the present invention, although both the pixel element 201 and the photo element 202 are still electrically connected to the shared common line $C_{p-1}$, the pixel TFT 2011 of the pixel element 201 and the switch TFT 2021 of the photo element 202 are not switched by the same gate line. Contrarily, the pixel TFT 2011 and the switch TFT 2021 are respectively switched by the first gate line $G_{n-1}$ and the second gate line $G_n$ in sequence. Therefore, the activations of the pixel TFT 2011 and the switch TFT 2021 are asynchronous, and the voltage fluctuation issues resulting from the shared common line could be overcome. The detailed explanations are provided as follows.

Figure 4B:
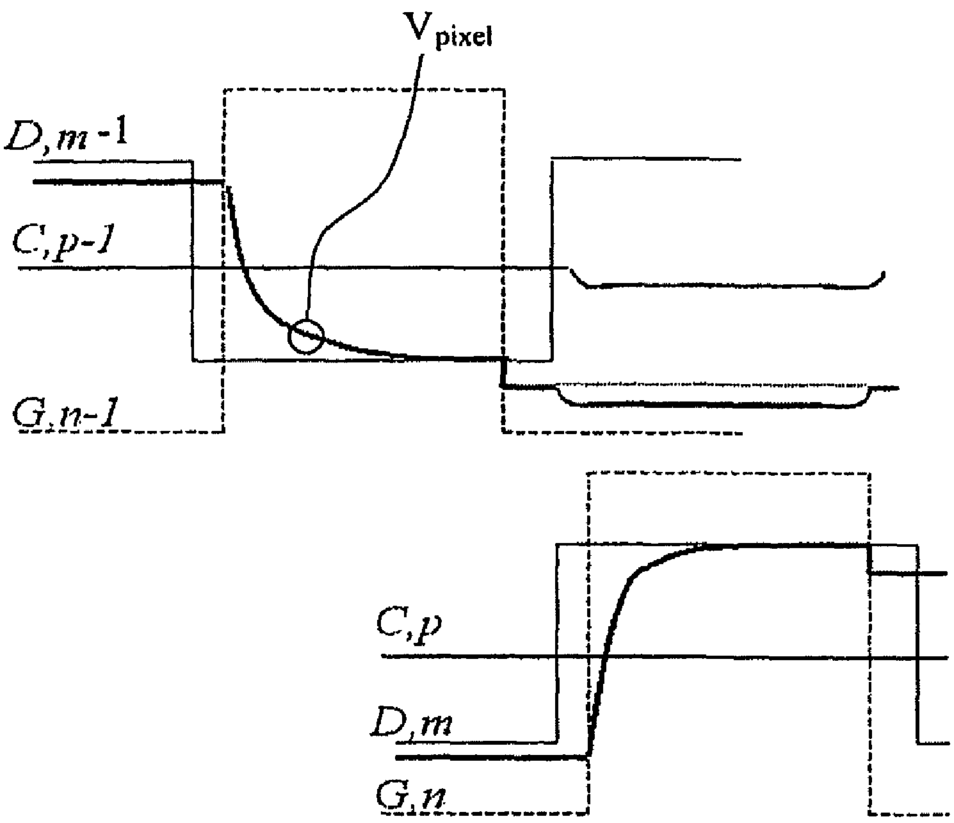
FIG. 4(B) schematically shows the operation of the driving signals according to the driving circuit of FIG. 4(A)

Please further refer to FIG. 4(B), which schematically shows the operation of the driving signals according to the driving circuit of FIG. 4(A). Since the pixel TFT 2011 and the switch TFT 2021 are activated by the first and the second gate lines $G_{n-1}$, $G_n$ in sequence, when the pixel TFT 2011 is activated through a first relative high signal from the first gate line $G_{n-1}$, a pixel voltage $V_{pixel}$ is generated for providing a gray value to the pixel, and when the pixel TFT 2011 is deactivated and the switch TFT 2021 is activated by a second relatively high signal from the second gate line $G_n$, a photo current is generated and read out through the readout line 203 since the common voltage is higher than what the readout line 203 has. Accordingly, when the switch TFT 2021 is switched off, the pixel TFT 2011 has been switched off in the previous deactivation state of the first gate line $G_{n-1}$. Since the pixel TFT 2011 is switched off beforehand, the voltage difference between the pixel voltage and the common voltage would not be affected by the fluctuation of the common voltage.

It should be noted that, when the pixel TFT 2011 is activated by a first relative high signal from the first gate line, the voltage of a pixel electrode is gradually approaching to a voltage level of a control data signal provided by the first data line $D_{m-1}$, as shown in FIG. 4(B). However, the voltage difference between the pixel voltage and the common voltage for providing a gray value is determined as a function of the voltage level of the control data signal and the common voltage.

Figure 5A:
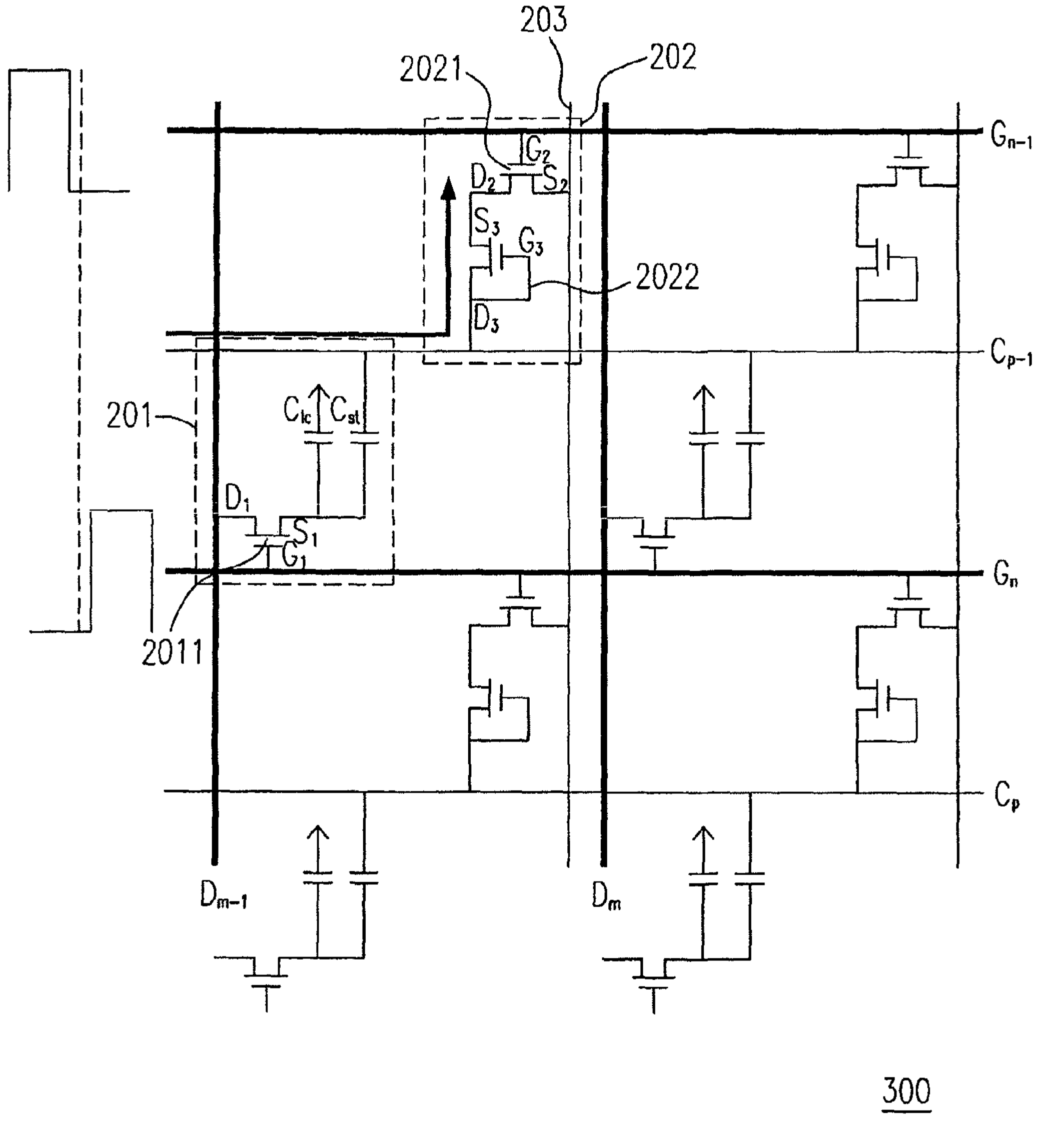
FIG. 5(A) schematically shows an equivalent driving circuit in an input display according to the second embodiment of the present invention.
Figure 5B:
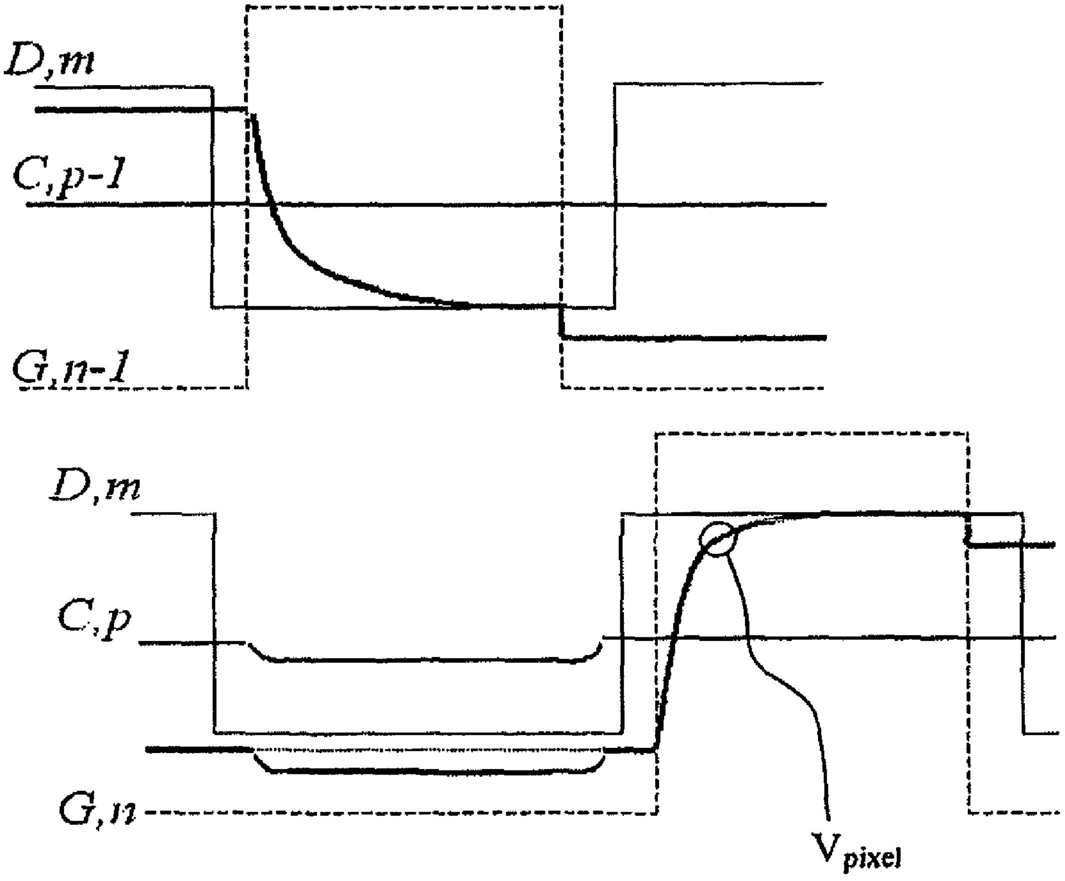
FIG. 5(B) schematically shows the operation of the driving signals according to the driving circuit of FIG. 5(A)

Please further refer to FIG. 5(A), which schematically shows an equivalent driving circuit in an input display according to the second embodiment of the present invention. In comparison with the driving circuit 200 according to the first embodiment of the present invention, the driving circuit 300 according to the second embodiment of the present invention is totally corresponding to the driving circuit 200 except the second gate electrode $G_2$ of the switch TFT 2021 being connected to the first gate line $G_{n-1}$ and the first gate electrode $G_1$ of the pixel TFT 2011 being connected to the second gate line $G_n$. In fact, the architecture of the driving circuit 300 is equivalent to that of the driving circuit 200, and the operation result of the driving signals according to the driving circuit 300 is totally identical with that of the driving circuit 200 if the activation sequence of the first and second gate lines is reversed. Therefore, the only difference between the driving circuit 200 and the driving circuit 300 is the driving sequence of the respective driving signals affecting the activations of the switch TFT 2021 and the photo TFT 2011 in each pixel, as shown in FIG. 5(B) and FIG. 4(B). Accordingly, as has been described above, since the switch TFT 2021 and the pixel TFT 2011 are activated by the first and the second gate lines in sequence, when the switch TFT 2021 is activated through a first relative high signal from the first gate line, a photo current is generated and read out through the readout line 203, and when the switch TFT 2021 is deactivated and the pixel TFT 2011 is activated by a second relatively high signal from the second gate line $G_n$, a pixel voltage $V_{pixel}$ is generated for providing a gray value to the pixel. Since the switch TFT 2021 is switched off beforehand, no fluctuation of the common voltage resulting from the switch TFT 2021 will occur when the pixel voltage is applied.

Figure 6:
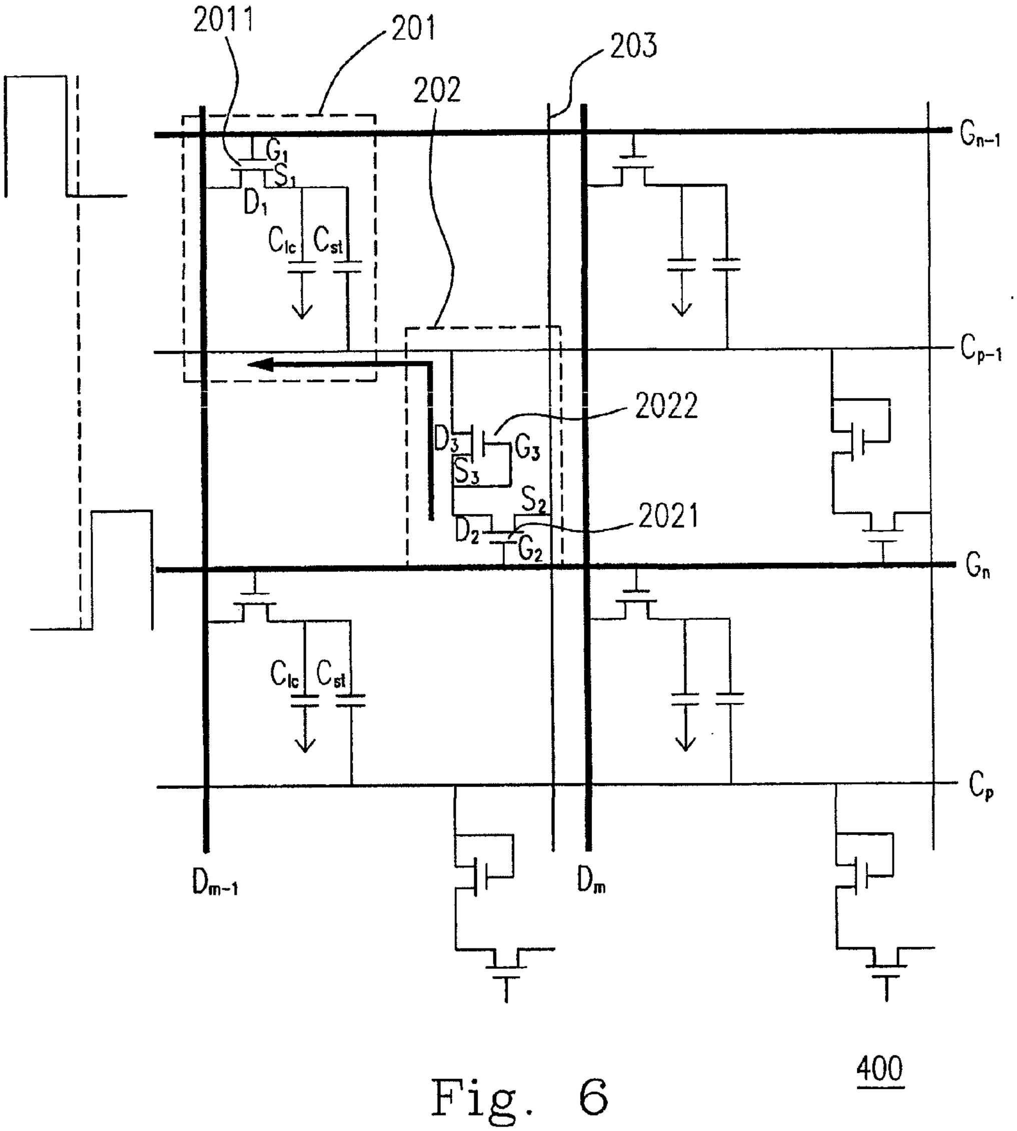
FIG. 6 schematically shows an equivalent driving circuit in an input display according to the third embodiment of the present invention.

Please refer to FIG. 6, which schematically show an equivalent driving circuit in an input display according to the third embodiment of the present invention. In comparison with the driving circuit 200 according to the first embodiment of the present invention, the driving circuit 400 according to the third embodiment of the present invention is almost equivalent to the driving circuit 200, except both of the third gate electrode $G_3$ and a third source electrode $S_3$ of the photo transistor 2022 being connected to the second drain electrode $D_2$ of the switch TFT 2021 and the third drain electrode $D_3$ being connected to the common line $C_{p-1}$. In such architecture like the driving circuit 400, it is especially applicable for the case when the common line $C_{p-1}$ has a common voltage lower than what the readout line 203 has. Similarly, since the pixel TFT 2011 and the switch TFT 2021 are activated by the first and the second gate lines in sequence, when the pixel TFT 2011 is activated through a first relative high signal from the first gate line, a pixel voltage is generated for providing a gray value to the pixel, and when the pixel TFT 2011 is deactivated and the switch TFT 2021 is activated by a second relatively high signal from the second gate line $G_n$, a photo current is generated and flown from the readout line 203 to the common line $C_{p-1}$ since the common voltage is lower than what the readout line 203 has. Accordingly, when the switch TFT 2021 is switched off, the pixel TFT 2011 has been switched off in the previous deactivation state of the first gate line $G_{n-1}$. Since the pixel TFT 2011 is switched off beforehand, the pixel voltage would not be affected by the fluctuation of the common voltage.

Figure 7:
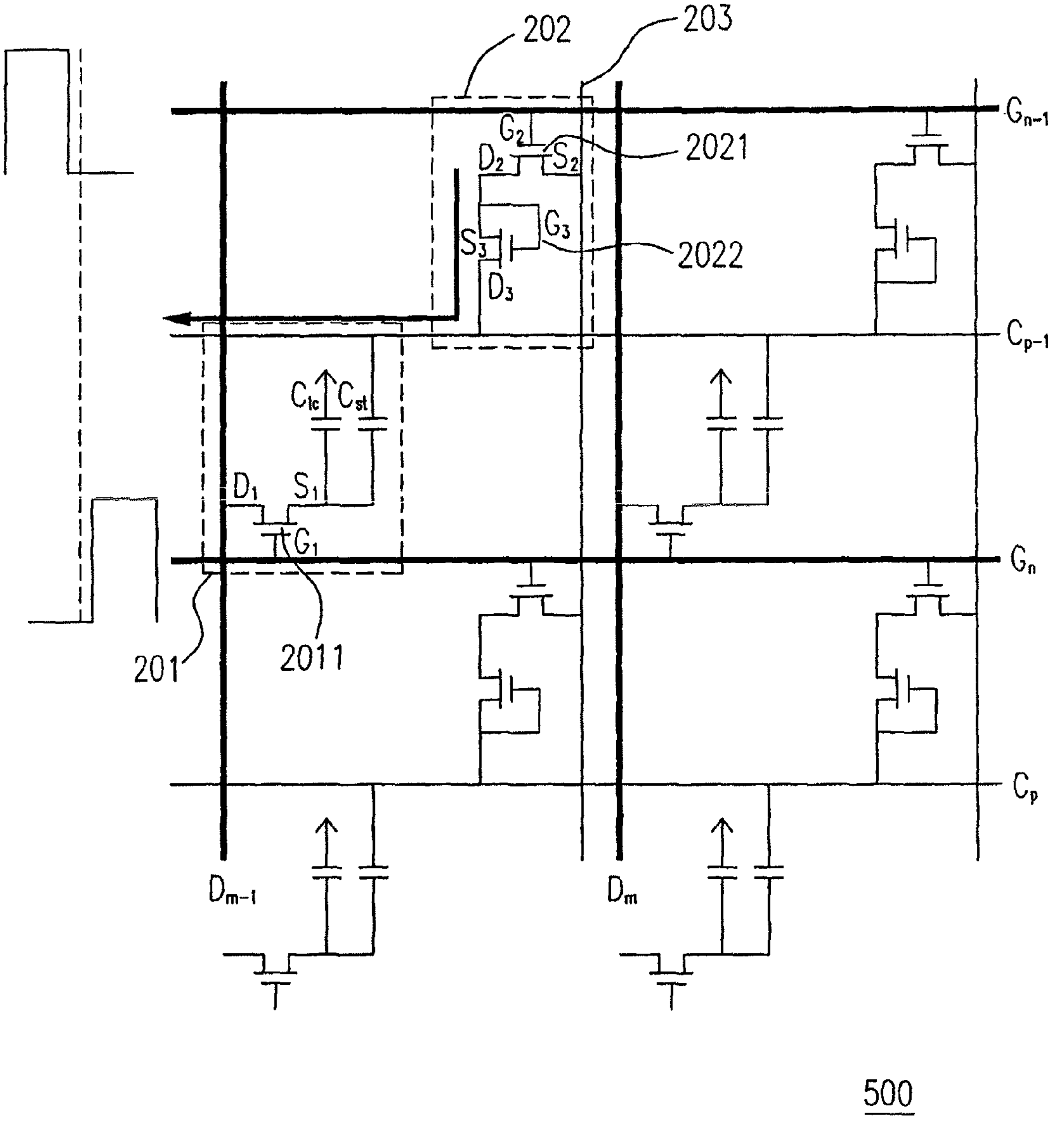
FIG. 7 schematically shows an equivalent driving circuit in an input display according to the fourth embodiment of the present invention.

As to the FIG. 7, it schematically shows the driving circuit 500 according to the fourth embodiment of the present invention. Similar, the architecture of the driving circuit 500 is totally equivalent to that of the driving circuit 400 if the activation sequence of the first and second gate lines is reversed. Therefore, the only difference between the driving circuit 400 and the driving circuit 500 is the driving sequence of the respective driving signals affecting the activations of the switch TFT 2021 and the pixel TFT 2011 in each pixel. Similarly, Since the switch TFT 2021 and the pixel TFT 2011 are activated by the first and the second gate lines in sequence, when the switch TFT 2021 is activated through a first relative high signal from the first gate line, a photo current is generated and flown from the readout line 203 to the common line $C_{p-1}$, and when the switch TFT 2021 is deactivated and the pixel TFT 2011 is activated by a second relatively high signal from the second gate line $G_n$, a pixel voltage is generated for providing a gray value to the pixel. Since the switch TFT 2021 is switched off beforehand, no fluctuation of the common voltage resulting from the switch TFT 2021 will occur when the pixel voltage is applied.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A driving circuit for an input display, comprising:

a first data line and a second data line disposed in parallel with each other;

a first gate line and a second gate line disposed in parallel with each other and intersected with the first data line and the second data line, so as to form a pixel of the input display thereby;

a shared common line disposed between the first gate line and the second gate line;

a first switching element having a first gate electrode connected to the second gate line;

a second switching element having a second gate electrode connected to the first gate line; and a third switching element connected between the shared common line and the second switching element and operating in a forward-bias state, wherein the first and the second gate lines operate in sequence, the first switching element and the second switching element are respectively activated by the first gate line and the second gate line in sequence, and the respective activations of the first switching element and the second switching element are asynchronous so as to avoid a voltage fluctuation.

2. The driving circuit according to claim 1, wherein the first switching element further comprises a first drain electrode connected to the first data line, and a first source electrode connected to the common line.

3. The driving circuit according to claim 2 further comprising a storage capacitor, through which the first source electrode is connected to the common line.

4. The driving circuit according to claim 2 further comprising a liquid crystal capacitor, through which the first source electrode is connected to a common electrode.

5. The driving circuit according to claim 1 further comprising a readout line disposed adjacent to the second data line and passing through the pixel of the input display.

6. The driving circuit according to claim 4, wherein the second switching element further comprises a second drain electrode, and a second source electrode connected to the readout line.

7. The driving circuit according to claim 5, wherein the third switching element further comprises a third gate electrode and a third drain electrode, both of which are connected to the common line, and a third source electrode connected to the second drain electrode.

8. The driving circuit according to claim 5, wherein the third switching element further comprises a third gate electrode and a third source electrode, both of which are connected to the second drain electrode, and a third drain electrode connected to the common line.

9. A driving circuit for an input display, comprising:

a first data line and a second data line disposed in parallel with each other;

a first gate line and a second gate line disposed in parallel with each other and intersected with the first data line and the second data line;

a shared common line disposed between the first gate line and the second gate line;

a pixel circuit comprising a pixel transistor having a first gate electrode connected to the second gate line; and a photo circuit comprising:

a switching transistor having a second gate electrode connected to the first gate line; and a photo transistor connected between the shared common line and the switching transistor and being in forward-bias operation, wherein the first gate line and the second gate line operate in sequence, the pixel transistor and the switching transistor are respectively activated by the first gate line and the second gate line in sequence, and the respective activations of the pixel transistor and the switching transistor are asynchronous so as to avoid a voltage fluctuation.

10. The driving circuit according to claim 9 further comprising a common line disposed between the first gate line and the second gate line, wherein both the pixel circuit and the photo circuit are connected to the common line.

11. The driving circuit according to claim 10, wherein the pixel transistor further comprises a first drain electrode connected to the first data line, and a first source electrode connected to the common line.

12. The driving circuit according to claim 11 further comprising a storage capacitor, through which the first source electrode is connected to a common electrode.

13. The driving circuit according to claim 11 further comprising a liquid crystal capacitor, through which the first source electrode is connected to a common electrode.

14. The driving circuit according to claim 9, wherein the first data line, the second data line, the first gate line and the second gate line form a pixel of the input display.

15. The driving circuit according to claim 14 further comprising a readout line disposed adjacent to the second data line and passing through the pixel.

16. The driving circuit according to claim 15, wherein the switching transistor further comprises a second drain electrode, and a second source electrode connected to the readout line.

17. The driving circuit according to claim 16, wherein the photo transistor further has a third gate and a third drain electrodes, both of which are connected to the common line, and a third source electrode connected to the second drain electrode.

18. The driving circuit according to claim 16, wherein the photo transistor further has a third gate and a third source electrodes, both of which are connected to the second drain electrode, and a third drain electrode connected to the common line.

19. A driving circuit for an input display, comprising:

a first data line and a second data line disposed in parallel with each other;

a first gate line and a second gate line disposed in parallel with each other and intersected with the first data line and the second data line;

a shared common line disposed between the first gate line and the second gate line;

a pixel circuit comprising a pixel transistor having a first gate electrode connected to the second gate line; and a photo circuit comprising:

a switching transistor having a second gate electrode connected to the first gate line; and a photo transistor connected between the shared common line and the switching transistor and being in forward-bias operation, wherein the first gate line and the second gate line operate in sequence, and the respective activations of the pixel transistor and the switching transistor are asynchronous so as to avoid a voltage fluctuation.

20. The driving circuit according to claim 19, wherein the pixel transistor and the switching transistor are respectively activated by the first gate line and the second gate line in sequence.

* * * * *